(12) United States Patent
Hu et al.

(10) Patent No.: US 10,455,999 B2
(45) Date of Patent: Oct. 29, 2019

(54) UPRIGHT VACUUM CLEANER

(71) Applicant: JIANGSU MIDEA CLEANING APPLIANCES CO., LTD., Suzhou (CN)

(72) Inventors: Wei Hu, Suzhou (CN); Hui Zou, Suzhou (CN); Xiahu Xiao, Suzhou (CN)

(73) Assignee: JIANGSU MIDEA CLEANING APPLIANCES CO., LTD., Suzhou (CN)

(*) Notice: Subject to any disclaimer, the term of this patent is extended or adjusted under 35 U.S.C. 154(b) by 344 days.

(21) Appl. No.: 15/636,166

(22) Filed: Jun. 28, 2017

(65) Prior Publication Data
US 2017/0319025 A1    Nov. 9, 2017

Related U.S. Application Data

(63) Continuation of application No. PCT/CN2016/075610, filed on Mar. 4, 2016.

(30) Foreign Application Priority Data

Dec. 10, 2015  (CN) .......................... 2015 1 0917466
Dec. 10, 2015  (CN) .......................... 2015 1 0917497
(Continued)

(51) Int. Cl.
*A47L 9/00*     (2006.01)
*A47L 9/10*     (2006.01)
(Continued)

(52) U.S. Cl.
CPC .............. *A47L 9/0411* (2013.01); *A47L 5/22* (2013.01); *A47L 5/28* (2013.01); *A47L 5/30* (2013.01);
(Continued)

(58) Field of Classification Search
CPC ...... A47L 9/0411; A47L 9/248; A47L 9/1683; A47L 9/2852; A47L 9/2857; A47L 9/16;
(Continued)

(56) References Cited

U.S. PATENT DOCUMENTS

| 6,772,474 | B2 * | 8/2004 | Nishikori | .................. | A47L 5/34 |
| | | | | | 15/351 |
| 2006/0005348 | A1 * | 1/2006 | Blocker | .................... | A47L 5/28 |
| | | | | | 15/359 |
| 2010/0088842 | A1 | 4/2010 | Worker et al. | | |

FOREIGN PATENT DOCUMENTS

| CN | 1368030 A | 9/2002 |
| CN | 1667197 A | 9/2005 |

(Continued)

OTHER PUBLICATIONS

Midea, International Search Report and Written Opinion, PCT/CN2016/075610, dated Aug. 26, 2016, 15 pgs.
(Continued)

*Primary Examiner* — David Redding
(74) *Attorney, Agent, or Firm* — Morgan, Lewis & Bockius LLP

(57) ABSTRACT

An upright vacuum cleaner (1) includes a brushroll assembly (100) having a brushroll casing (12) and a brushroll (11); a motor assembly (200) having a motor housing (21) and a motor (22); a body assembly (300) having a body (31) and a bridging member (32), in which the bridging member (32) is pivotally connected to the motor housing (21) to make the body (31) rotatable between an upright position and an oblique position; and an elastic assembly (4) provided between the brushroll casing (12) and the bridging member (32), and configured to be pressed downward against the brushroll casing (12) by the bridging member (32) when the body (31) rotates from the upright position to the oblique position.

20 Claims, 5 Drawing Sheets

(30) Foreign Application Priority Data

| Dec. 10, 2015 | (CN) | 2015 1 0917498 |
|---|---|---|
| Dec. 10, 2015 | (CN) | 2015 1 0917499 |
| Dec. 10, 2015 | (CN) | 2015 1 0917528 |
| Dec. 10, 2015 | (CN) | 2015 1 0917653 |
| Dec. 10, 2015 | (CN) | 2015 1 0918541 |
| Dec. 10, 2015 | (CN) | 2015 1 0918544 |
| Dec. 10, 2015 | (CN) | 2015 1 0918580 |
| Dec. 10, 2015 | (CN) | 2015 1 0918662 |
| Dec. 10, 2015 | (CN) | 2015 2 1027156 U |
| Dec. 10, 2015 | (CN) | 2015 2 1027158 U |
| Dec. 10, 2015 | (CN) | 2015 2 1027550 U |
| Dec. 10, 2015 | (CN) | 2015 2 1028726 U |
| Dec. 10, 2015 | (CN) | 2015 2 1028730 U |
| Dec. 10, 2015 | (CN) | 2015 2 1028739 U |
| Dec. 10, 2015 | (CN) | 2015 2 1028779 U |
| Dec. 10, 2015 | (CN) | 2015 2 1028784 U |
| Dec. 10, 2015 | (CN) | 2015 2 1028812 U |
| Dec. 10, 2015 | (CN) | 2015 2 1028814 U |
| Dec. 10, 2015 | (CN) | 2015 2 1028913 U |
| Dec. 10, 2015 | (CN) | 2015 2 1029002 U |
| Dec. 10, 2015 | (CN) | 2015 2 1029087 U |
| Dec. 10, 2015 | (CN) | 2015 2 1029798 U |
| Dec. 10, 2015 | (CN) | 2015 2 1030034 U |
| Mar. 1, 2016 | (CN) | 2016 1 0114861 |
| Mar. 1, 2016 | (CN) | 2016 2 0155481 U |

(51) Int. Cl.

| *A47L 9/14* | (2006.01) |
|---|---|
| *A47L 5/28* | (2006.01) |
| *A47L 9/16* | (2006.01) |
| *A47L 9/24* | (2006.01) |
| *F16D 23/12* | (2006.01) |
| *A47L 9/04* | (2006.01) |
| *A47L 5/22* | (2006.01) |
| *A47L 9/28* | (2006.01) |
| *A47L 5/30* | (2006.01) |
| *F16H 7/08* | (2006.01) |

(52) U.S. Cl.
CPC .................................... *A47L 9/00* (2013.01); *A47L 9/04* (2013.01); *A47L 9/0444* (2013.01); *A47L 9/0477* (2013.01); *A47L 9/102* (2013.01); *A47L 9/1409* (2013.01); *A47L 9/16* (2013.01); *A47L 9/1683* (2013.01); *A47L 9/248* (2013.01); *A47L 9/28* (2013.01); *A47L 9/2852* (2013.01); *A47L 9/2857* (2013.01); *F16H 7/0827* (2013.01); *F16D 2023/126* (2013.01)

(58) Field of Classification Search
CPC .......... A47L 5/28; A47L 9/1409; A47L 9/102; A47L 9/0477; A47L 9/0444; A47L 5/30; A47L 9/28; A47L 9/04; A47L 9/00; A47L 5/22; A47L 5/34; A47L 9/325; A47L 9/2863; A47L 5/32; F16H 7/0827; F16D 2023/126
USPC .................................................... 15/354, 362
See application file for complete search history.

(56) References Cited

FOREIGN PATENT DOCUMENTS

| CN | 2845692 Y | 12/2006 |
|---|---|---|
| CN | 101032383 A | 9/2007 |
| CN | 201033055 Y | 3/2008 |
| CN | 101201123 A | 6/2008 |
| CN | 102038454 A | 5/2011 |
| CN | 102038459 A | 5/2011 |
| CN | 202235160 U | 5/2012 |
| CN | 205251417 U | 5/2016 |
| CN | 205251420 U | 5/2016 |
| CN | 205338839 U | 6/2016 |
| JP | 2008023016 A | 2/2008 |

OTHER PUBLICATIONS

Jiangsu Midea Electrical Appliance Co., Ltd., First Office Action, CN201510917528.X, dated Jun. 1, 2017, 15 pgs.
Jiangsu Midea Electrical Appliance Co., Ltd., First Office Action, CN201510917653.0, dated Jun. 5, 2017, 16 pgs.
Jiangsu Midea Electrical Appliance Co., Ltd., First Office Action, CN201510917499.7, dated May 26, 2017, 6 pgs.

\* cited by examiner

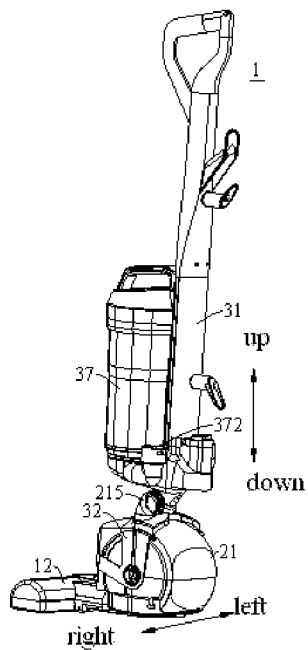
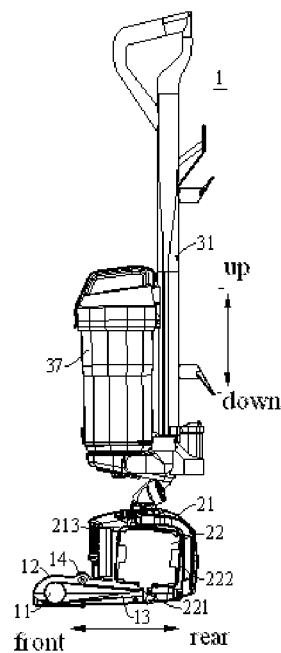
Fig. 5              Fig. 6
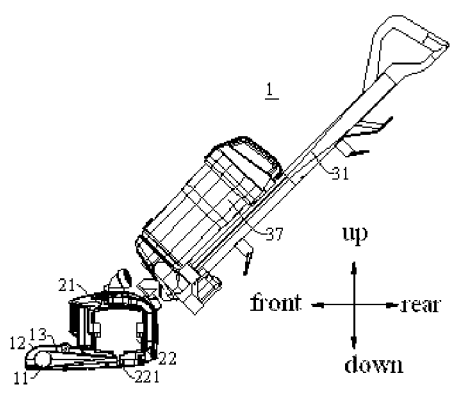
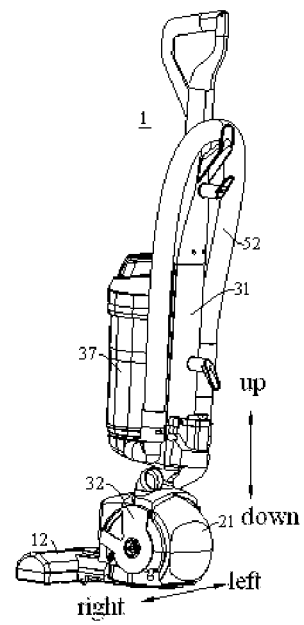
Fig. 7              Fig. 8

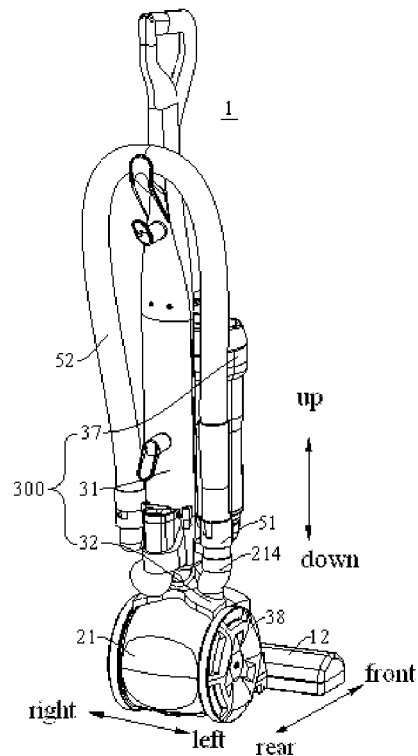
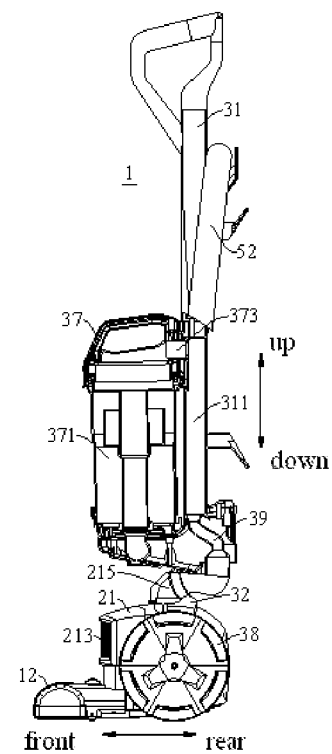
Fig. 9        Fig. 10
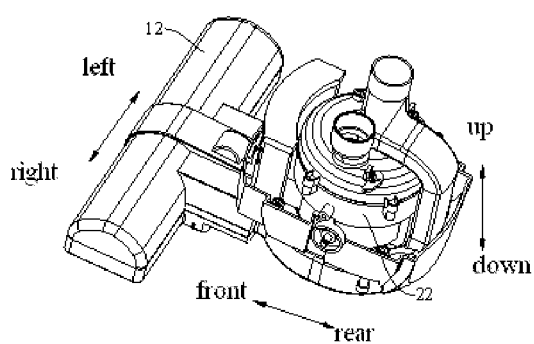
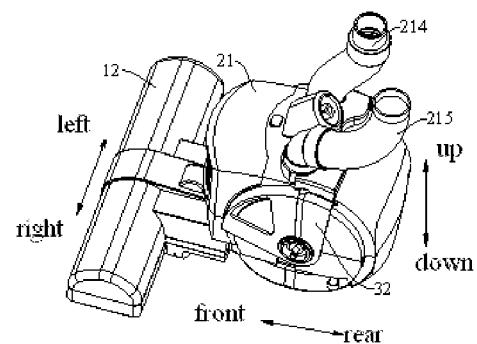
Fig. 11        Fig. 12

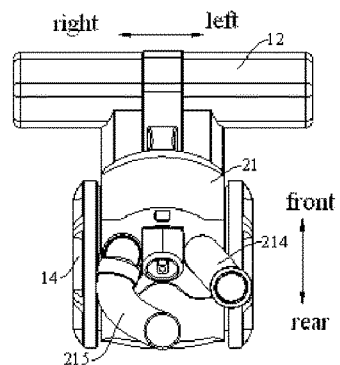
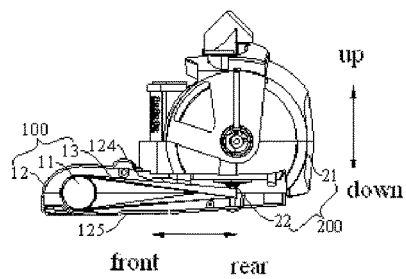
Fig. 13          Fig. 14
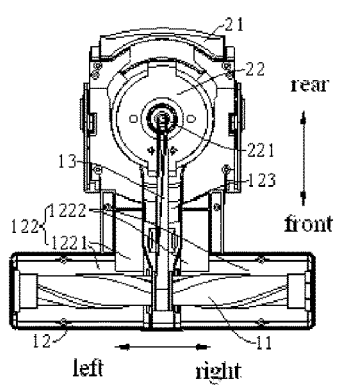
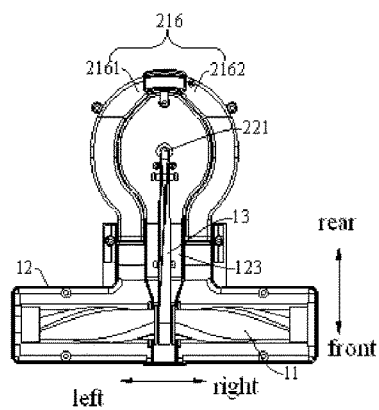
Fig. 15          Fig. 16
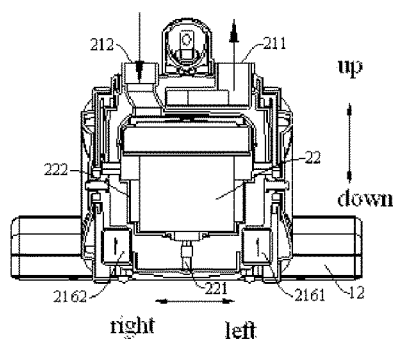
Fig. 17

UPRIGHT VACUUM CLEANER

PRIORITY CLAIM AND RELATED APPLICATIONS

This application is a continuation application of PCT Patent Application No. PCT/CN2016/075610, entitled "UPRIGHT VACUUM CLEANER" filed on Mar. 4, 2016, which claims priority to Chinese Patent Application No. 201510917499.7, entitled "UPRIGHT VACUUM CLEANER" filed on Dec. 10, 2015, Chinese Patent Application No. 201521029002.X, entitled "UPRIGHT VACUUM CLEANER", filed on Dec. 10, 2015, Chinese Patent Application No. 201510917466.2, entitled "UPRIGHT VACUUM CLEANER", filed on Dec. 10, 2015, Chinese Patent Application No. 201521028726.2, entitled "UPRIGHT VACUUM CLEANER", filed on Dec. 10, 2015, Chinese Patent Application No. 201510917497.8, entitled "UPRIGHT VACUUM CLEANER", filed on Dec. 10, 2015, Chinese Patent Application No. 201521028730.9, entitled "UPRIGHT VACUUM CLEANER", filed on Dec. 10, 2015, Chinese Patent Application No. 201521029087.1, entitled "UPRIGHT VACUUM CLEANER", filed on Dec. 10, 2015, Chinese Patent Application No. 201510918662.1, entitled "UPRIGHT VACUUM CLEANER", filed on Dec. 10, 2015, Chinese Patent Application No. 201521028812.3, entitled "UPRIGHT VACUUM CLEANER", filed on Dec. 10, 2015, Chinese Patent Application No. 201510918544.0, entitled "UPRIGHT VACUUM CLEANER", filed on Dec. 10, 2015, Chinese Patent Application No. 201521028739.X, entitled "UPRIGHT VACUUM CLEANER", filed on Dec. 10, 2015, Chinese Patent Application No. 201510918580.7, entitled "UPRIGHT VACUUM CLEANER", filed on Dec. 10, 2015, Chinese Patent Application No. 201521027156.5, entitled "UPRIGHT VACUUM CLEANER", filed on Dec. 10, 2015, Chinese Patent Application No. 201510917498.2, entitled "UPRIGHT VACUUM CLEANER", filed on Dec. 10, 2015, Chinese Patent Application No. 201521027158.4, entitled "UPRIGHT VACUUM CLEANER", filed on Dec. 10, 2015, Chinese Patent Application No. 201521028814.2, entitled "UPRIGHT VACUUM CLEANER", filed on Dec. 10, 2015, Chinese Patent Application No. 201521028779.4, entitled "UPRIGHT VACUUM CLEANER", filed on Dec. 10, 2015, Chinese Patent Application No. 201521029798.9, entitled "UPRIGHT VACUUM CLEANER", filed on Dec. 10, 2015, Chinese Patent Application No. 201510918541.7, entitled "UPRIGHT VACUUM CLEANER", filed on Dec. 10, 2015, Chinese Patent Application No. 201521027550.9, entitled "UPRIGHT VACUUM CLEANER", filed on Dec. 10, 2015, Chinese Patent Application No. 201521028784.5, entitled "UPRIGHT VACUUM CLEANER", filed on Dec. 10, 2015, Chinese Patent Application No. 201510917653.0, entitled "UPRIGHT VACUUM CLEANER", filed on Dec. 10, 2015, Chinese Patent Application No. 201510917528.X, entitled "UPRIGHT VACUUM CLEANER", filed on Dec. 10, 2015, Chinese Patent Application No. 201521028913.0, entitled "UPRIGHT VACUUM CLEANER", filed on Dec. 10, 2015, Chinese Patent Application No. 201521030034.1, entitled "UPRIGHT VACUUM CLEANER", filed on Dec. 10, 2015, Chinese Patent Application No. 201610114861.1, entitled "UPRIGHT VACUUM CLEANER", filed on Mar. 1, 2016, and Chinese Patent Application No. 201620155481.8, entitled "UPRIGHT VACUUM CLEANER", filed on Mar. 1, 2016, all of which are incorporated by reference in their entirety.

TECHNICAL FIELD

The present disclosure relates to a field of cleaning machines, and more particularly to an upright vacuum cleaner.

BACKGROUND

During the use of a vacuum cleaner in the related art, a brushroll casing is easy to separate from a surface to be cleaned, which may degrade the dust suction effect, and hence the impurities (like dust and debris) may remain at the surface to be cleaned. Furthermore, when the brushroll casing is leaving the surface to be cleaned, the impurities sucked into the brushroll casing tend to kick up from a gap between the brushroll casing and the surface to be cleaned, which may cause secondary pollution and poor cleaning effects.

SUMMARY

The present disclosure aims to solve at least one of the problems existing in the related art. Thus, embodiments of the present disclosure provide an upright vacuum cleaner that may cause a brushroll to abut on a surface to be cleaned during use, so as to improve the cleaning effect.

According to the embodiments of the present disclosure, the upright vacuum cleaner includes: a brushroll assembly including a brushroll casing and a brushroll provided within the brushroll casing; a motor assembly including a motor housing and a motor provided within the motor housing; a body assembly including a body and a bridging member mounted on the body, in which the bridging member is pivotally connected to the motor housing to make the body rotatable between an upright position and an oblique position; and an elastic assembly provided between the brushroll casing and the bridging member, and configured to be pressed downward against the brushroll casing by the bridging member when the body rotates from the upright position to the oblique position.

In the upright vacuum cleaner according to the embodiments of the present disclosure, the bridging member is pivotally connected to the motor housing and the elastic assembly is provided between the brushroll casing and the bridging member, such that when the body rotates from the upright position to the oblique position, the elastic assembly is pressed by the bridging member to push the brushroll casing downwards to abut on the surface to be cleaned, so as to improve the cleaning effect.

According to an example of the present disclosure, the bridging member has a contact edge in cooperative contact with the elastic assembly to compress the elastic assembly, and the contact edge is configured as an arc edge with a rotating axis of the bridging member as a central axis.

According to an example of the present disclosure, the contact edge is a part of an outer contour edge of the bridging member.

According to an example of the present disclosure, the bridging member is formed with a limiting groove into which an end of the elastic assembly pops along the contact edge when the body moves to the upright position, and the limiting groove is jointed with the contact edge.

According to an example of the present disclosure, the elastic assembly includes: a movable block configured to contact and cooperate with the bridging member; and a first elastic member having two ends clamped between the movable block and the brushroll casing.

According to an example of the present disclosure, a surface of the movable block in cooperative contact with the bridging member is configured as a curved surface.

According to an example of the present disclosure, the brushroll casing is formed with an accommodating groove and the first elastic member is accommodated elastically within the accommodating groove.

According to an example of the present disclosure, the first elastic member is a spring.

According to an example of the present disclosure, the bridging member includes a top plate and two side plates connected at both sides of the top plate, each side plate pivotally connected to two side walls of the motor housing; there are two elastic assemblies and each elastic assembly cooperates with the two side plates respectively.

According to an example of the present disclosure, the two elastic assemblies are provided at both sides of the motor housing.

According to an example of the present disclosure, the upright vacuum cleaner further includes: two wheels provided at both sides of the motor housing and rotatably connected to the motor housing, in which the two side plates are clamped between the two side walls of the motor housing and the corresponding wheels respectively.

According to an example of the present disclosure, the body and the bridging member are connected to a connecting pipe assembly.

According to an example of the present disclosure, the connecting pipe assembly includes: a first connecting pipe provided on the top plate of the bridging member; and a second connecting pipe provided at a lower end of the body, in which the first connecting pipe is fitted over the second connecting pipe.

According to an example of the present disclosure, the body and the bridging member are positioned by a positioning assembly to cooperate with each other.

According to an example of the present disclosure, the positioning assembly includes: a first positioning element provided on the top plate of the bridging member; and a second positioning element provided at the lower end of the body; one of the first positioning element and the second positioning element is a positioning column and the other thereof is a positioning cartridge.

According to an example of the present disclosure, the upright vacuum cleaner further includes: a limiting column provided on the motor housing movably in an up-and-down direction, in which the limiting column is inserted into the bridging member to cooperate with the bridging member for limitation when the body is in the upright position, and the limiting column is detached from the bridging member when the body moves from the upright position to the oblique position.

According to an example of the present disclosure, a second elastic member connected between the limiting column and the motor housing to make the limiting column movable in the up-and-down direction.

According to an example of the present disclosure, the first connecting pipe is provided on the top plate of the bridging member and is provided with the positioning column therein; the second connecting pipe is provided at the lower end of the body and is provided with the positioning cartridge therein; and the positioning cartridge is fitted over the positioning column after the second connecting pipe is inserted in the first connecting pipe.

According to an example of the present disclosure, the brushroll casing has a dust suction port; the motor housing is provided with an air exhaust hole, a dirty air output pipe and a clean air input pipe; a motor air-suction channel and a motor air-exhaust channel are provided in the motor housing; the motor air-suction channel is communicated between the dust suction port and the dirty air output pipe, while the motor air-exhaust channel is communicated between the clean air input pipe and the air exhaust hole; the bridging member is provided with a first clearance groove for avoiding the dirty air output pipe and a second clearance groove for avoiding the clean air input pipe.

According to an example of the present disclosure, the first clearance groove and the second clearance groove each are configured as a semi-circular groove and arranged axially symmetrically relative to a longitudinal central line of the bridging member.

According to an example of the present disclosure, a rotating axis of the motor and a rotating axis of the brushroll are disposed in a non-parallel manner; the motor drives the brushroll to roll by a drive belt and is rotatable relative to the motor housing between an upright tensioning position where the drive belt is tensioned and an oblique releasing position where the drive belt is loosened; and the motor is moved from the oblique position to the upright position by the bridging member when the body rotates from the upright position to the oblique position.

According to an example of the present disclosure, the upright vacuum cleaner further includes a clutching device provided between the bridging member and the motor, in which the motor is moved by the bridging member via the clutching device from the oblique releasing position to the upright tensioning position when the body moves from the upright position to the oblique position.

According to an example of the present disclosure, a motor shaft of the motor is provided vertically; the rotating axis of the brushroll is perpendicular to the motor shaft; and the drive belt is provided at a twist angle of 90°.

According to an example of the present disclosure, the brushroll includes a first brushroll section provided with bristles, a second brushroll section provided with bristles, and a connecting-shaft section connected between the first brushroll section and the second brushroll section; the drive belt is winded upon the motor shaft and the connecting-shaft section to drive the brushroll to roll by the motor; the first brushroll section, respective central axes of the second brushroll section and the connecting-shaft section are located in the same line; the first brushroll section and the second brushroll section are provided symmetrically relative to the drive belt.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

FIG. 5 is a schematic view of an upright vacuum cleaner according to an embodiment of the present disclosure;

FIG. 6 is a side view of the upright vacuum cleaner of FIG. 5 when a body is in an oblique releasing position;

FIG. 7 is a side view of the upright vacuum cleaner of FIG. 5 when a body is in an upright tensioning position;

FIG. 8 is a schematic view of the upright vacuum cleaner of FIG. 5 in a direction;

FIG. 9 is a schematic view of an upright vacuum cleaner according to another embodiment of the present disclosure;

FIG. 10 is a side view of the upright vacuum cleaner of FIG. 9;

FIG. 11 is an assembly drawing of a brushroll assembly and a motor assembly of an upright vacuum cleaner according to an embodiment of the present disclosure;

FIG. 12 is an assembly drawing of a brushroll assembly and a motor assembly of an upright vacuum cleaner according to another embodiment of the present disclosure;

FIG. 13 is a top view of the structure shown in FIG. 12;

FIG. 14 is a side view of the structure shown in FIG. 11;

FIG. 15 is a bottom view of the structure shown in FIG. 11;

FIG. 16 is a schematic view of an internal channel of the structure shown in FIG. 15;

FIG. 17 is a rear view of an internal channel of the structure shown in FIG. 13;

Figure 1:
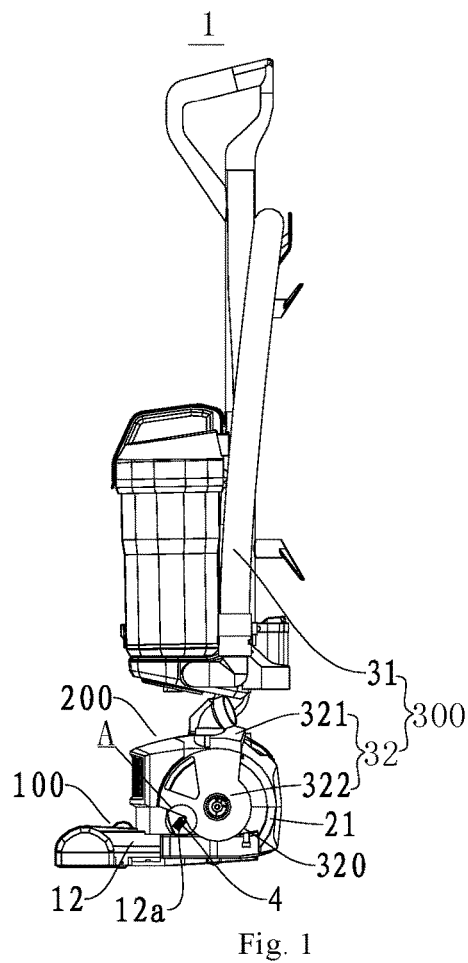
FIG. 1 is a schematic view of an upright vacuum cleaner according to an embodiment of the present disclosure, in which a body is in an upright position.

REFERENCE NUMERALS 1 upright vacuum cleaner
100 brushroll assembly
  11 brushroll
  111 first brushroll section
  1111 first body
  1112 first bristle
  112 second brushroll section
  1121 second body
  1122 second bristle
  113 connecting-shaft section
  114 first baffle
  115 second baffle
  12 brushroll casing
  12a accommodating groove
  122 brushroll air-suction channel
  1221 first air-suction channel
  1222 second air-suction channel
  123 drive-belt mounting chamber
  124 upper casing
  125 lower casing
  13 drive belt
  14 tensioning wheel
200 motor assembly
  21 motor housing
  211 dirty air outlet
  212 clean air inlet
  213 air exhaust hole
  214 dirty air output pipe
  215 clean air input pipe
  216 motor air-suction channel
  2161 first branch channel
  2162 second branch channel
  22 motor
  221 motor shaft
  222 motor casing
300 body assembly
  31 body
  311 body air-exhaust channel
  32 bridging member
  32a limiting groove
  320 contact edge
  321 top plate
  3211 first clearance groove
  3212 second clearance groove
  322 side plate
  33 connecting pipe assembly
  331 first connecting pipe
  332 second connecting pipe
  34 positioning assembly
  341 first positioning piece
  342 second positioning piece
  35 limiting column
  36 second elastic member
  37 dirt cup
  371 separating chamber
  372 air inlet
  373 air outlet
  38 wheel
  39 air exhaust pipe
400 clutching device
  4 elastic assembly
  41 movable block
  42 first elastic member
51 air-inlet pipe
52 hose

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

The following description provides many different embodiments or examples to realize different structures of the present disclosure. To simplify the description of the present disclosure, components and configurations in specific examples are elaborated. Of course, they are only explanatory, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

An upright vacuum cleaner 1 according to embodiments of the present disclosure will be described with reference to FIGS. 1 to 22. An up-and-down direction refers to the up-and-down direction when the upright vacuum cleaner 1 is in normal use.

Figure 2:
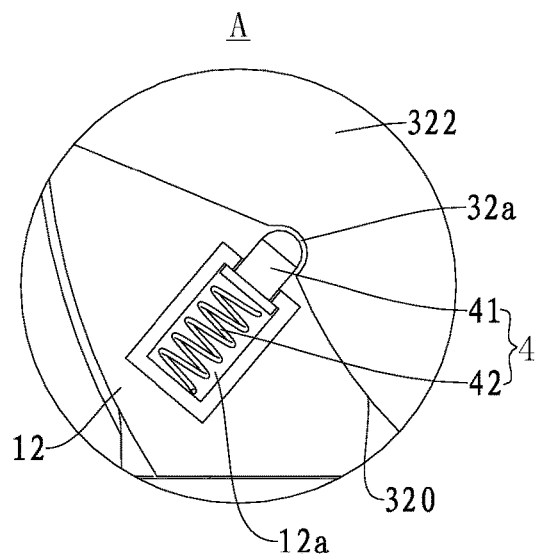
FIG. 2 is an enlarged view of part A of FIG. 1.
Figure 3:
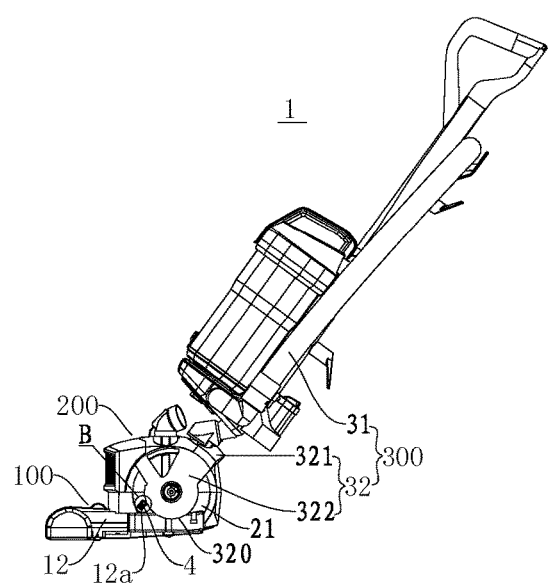
FIG. 3 is a schematic view of an upright vacuum cleaner according to an embodiment of the present disclosure, in which a body is in an oblique position.

As shown in FIG. 1 to FIG. 3, the upright vacuum cleaner 1 according to embodiments of the present disclosure includes: a brushroll assembly 100, a motor assembly 200, a body assembly 300 and an elastic assembly 4.

Specifically, the brushroll assembly 100 includes a brushroll casing 12 and a brushroll 11 provided within the brushroll casing 12. The brushroll casing 12 may not only protect the brushroll 11 and the drive mechanism, but also prevent the dust and debris from kicking up, which may cause secondary pollution. The motor assembly 200 includes a motor housing 21 and a motor 22 provided in the motor housing 21. The motor 22 may drive the rotation of a fan and also supply power to drive the brushroll 11 to roll, so as to realize the objectives of vacuuming and cleaning at the same time.

The body assembly 300 includes a body 31 and a bridging member 32 mounted on the body 31, in which the bridging member 32 is rotatably connected to the motor housing 21 to make the body 31 rotatable between an upright position and an oblique position. When the upright vacuum cleaner 1 is unused, as shown in FIG. 1, the body 31 may be moved to the upright position to reduce the occupation area and facilitate the placement of the upright vacuum cleaner 1. When the upright vacuum cleaner 1 cleans a surface to be cleaned, the user may rotate the body 31 and the bridging member 32. As shown in FIG. 3, the body 31 may be moved to the oblique position, such that the user may push or pull the upright vacuum cleaner 1 effortlessly to realize movably cleaning.

As for the elastic assembly 4, as shown in FIG. 1 to FIG. 4, the elastic assembly 4 may be provided between the brushroll casing 12 and the bridging member 32, and configured to be pressed downward against the brushroll casing 12 by the bridging member 32 when the body 31 rotates from the upright position to the oblique position. In such a way, the brushroll 11 may abut on the surface to be cleaned to improve the cleaning effect.

In the upright vacuum cleaner 1 according to the embodiments of the present disclosure, the bridging member 32 is pivotally connected to the motor housing 21 and the elastic assembly 4 is provided between the brushroll casing 12 and the bridging member 32, such that when the body 31 rotates from the upright position to the oblique position, the elastic assembly 4 is pressed by the bridging member 32 to push down the brushroll casing 12 to abut on the surface to be cleaned, such that the impurities on the surface to be cleaned may be sucked into the brushroll casing 12 better. The vacuuming effect of the upright vacuum cleaner 1 may be improved on one hand, and the sucked impurities may be prevented from kicking up which may cause secondary pollution, so as to improve the cleaning effect.

According to some embodiments of the present disclosure, the bridging member 32 may have a contact edge 320 in cooperative contact with the elastic assembly 4 to compress the elastic assembly 4. As shown in FIG. 1 and FIG. 3, the contact edge 320 may be configured as an arc edge with a rotating axis of the bridging member 32 as a central axis. Thus, when the bridging member 32 rotates with respect to the motor housing 21, the contact edge 320 may contact and cooperate with the elastic assembly 4 to compress the elastic assembly 4. When the body 31 is moved from the upright position to the oblique position, the contact edge 320 may compress the elastic assembly 4 to press the brushroll casing 12 downwards, such that the brushroll 11 abuts on the surface to be cleaned, so as to improve the cleaning effect. Moreover, since the contact edge 320 is the arc edge, the resistance imposed on the bridging member 32 during rotation may be reduced to make the body 31 rotate freely and facilitate control over the body 31.

As an alternative embodiment, as shown in FIG. 1 and FIG. 3, the contact edge 320 may be a part of the outer contour edge of the bridging member 32. That is, a part of the outer contour edge of the bridging member 32 may constitute the contact edge 320, so as to make the structure simple and compact and facilitate processing and manufacturing, thereby lowering the cost.

Alternatively, as shown in FIG. 2, the bridging member 32 may be formed with a limiting groove 32a into which an end of the elastic assembly 4 pops along the contact edge 320 when the body 31 is moved to the upright position, and the limiting groove 32a is jointed with the contact edge. Hence, the cooperation of the elastic assembly 4 and the limiting groove 32a may improve the stability and reliability of the body 31 when the body 31 is locked at the upright position, so as to facilitate placing the upright vacuum cleaner 1.

According to some embodiments of the present disclosure, the elastic assembly 4 may include: a movable block 41 able to contact and cooperate with the bridging member 32; and a first elastic member 42 having two ends clamped between the movable block 41 and the brushroll casing 12. Thus, the first elastic member 42 may push the movable block 41 to move along the contact edge 320. When the body 31 is moved to the upright position, an end of the movable block 41 remote from the first elastic member 42 pops into the limiting groove 32a along the contact edge 320 to make the body 31 locked in the upright position. In the process that the body 31 is moved from the upright position to the oblique position, the bridging member 32 may compress the first elastic member 42 to make the first elastic member 42 press the brushroll casing 12 downwards, such that the brushroll 11 abuts on the surface to be cleaned to improve the cleaning effect.

Alternatively, a surface of the movable block 41 in contact and cooperation with the bridging member 32 is configured as a curved surface. For example, as shown in FIG. 2 and FIG. 4, a surface of the movable block 41 remote from the first elastic member 42 is configured as a curved surface to reduce the sliding resistance during the cooperation or cooperative contact of the movable block 41 with the limiting groove 32a, to further reduce the resistance imposed on the bridging member 32 during rotation, so as to make the body 31 rotate freely and slow down abrasion to prolong the service life.

Figure 4:
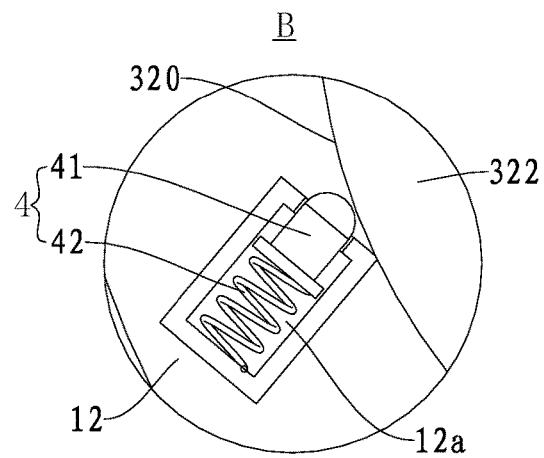
FIG. 4 is an enlarged view of part B of FIG. 3.

In some embodiments of the present disclosure, as shown in FIG. 2 and FIG. 4, the brushroll casing 12 may be formed with an accommodating groove 12a and the first elastic member 42 may be accommodated elastically within the accommodating groove 12a. In such a way, the flexing direction of the first elastic member 42 may be restricted by the accommodating groove 12a to prevent the movable block 41 from slipping out, so as to improve the reliability of the elastic assembly 4.

Alternatively, the first elastic member 42 may be a spring. As shown in FIG. 1 to FIG. 4, two ends of the spring are clamped between the movable block 41 and the brushroll casing 12, and the spring may push the movable block 41 away from the brushroll casing 12. On one hand, when the body 31 is moved from the upright position to the oblique position, the curved surface of the movable block 41 may contact with the contact edge 320 of the bridging member 32 to compress the spring. Under the action of the spring, the brushroll casing 12 is moved downwards to cause the brushroll 11 to abut on the surface to be cleaned to improve the cleaning effect. On the other hand, when the body 31 is moved to the upright position, the movable block 41 corresponds to the limiting groove 32a, and under the action of the spring, the movable block 41 moves in a direction away from the brushroll casing 12 and automatically cooperates with the limiting groove 32a to make the body 31 locked in the upright position, which is convenient and simple and may reduce the cost.

According to some embodiments of the present disclosure, as shown in FIG. 1 and FIG. 3, the bridging member 32 may include a top plate 321 and two side plates 322 connected at both sides of the top plate 321, each side plate 322 pivotally connected to two side walls of the motor housing 21; there are two elastic assemblies 4 and each elastic assembly 4 cooperates with the two side plates 322 respectively. That is, the two side plates 322 may rotate with respect to the motor housing 21, and the two elastic assemblies 4 are provided between the brushroll casing 12 and the side plates 322. Since the two elastic assemblies 4 cooperate with the two side plates 322 respectively, the two elastic assemblies 4 may be pressed by the two side plates 322 when the body 31 is moved from the upright position to the oblique position, such that the two elastic assemblies 4 press the brushroll casing 12 downwards from two sides to abut on the surface to be cleaned, so as to improve the balance and stability. Furthermore, when the body 31 is moved to the upright position, the two elastic assemblies 4 may cooperate in the limiting grooves 32a of the two side plates 322 to make the body 31 locked in the upright position, which is reliable and convenient to operate.

Alternatively, the two elastic assemblies 4 may be provided at both sides of the electric motor housing 21 symmetrically to make the structure of the upright vacuum cleaner 1 simple and compact and create an aesthetic outlook.

In conclusion, for the upright vacuum cleaner 1 according to the embodiments of the present disclosure, the bridging member 32 is pivotally connected to the motor housing 21 and the elastic assembly 4 is provided between the brushroll casing 12 and the bridging member 32, such that when the body 31 rotates from the upright position to the oblique position, the elastic assembly 4 is pressed by the bridging member 32 to push the brushroll casing 12 downwards to abut on the surface to be cleaned, such that the impurities on the surface to be cleaned may be sucked into the brushroll casing 12 better. The vacuuming effect of the upright vacuum cleaner 1 may be improved on one hand, and the sucked impurities may be prevented from kicking up which may cause secondary pollution, so as to improve the cleaning effect. Additionally, it is possible to lock the body 31 in the upright position with simple operation and high reliability by providing the limiting groove 32a in the bridging member 32 under the cooperation of the elastic assembly 4 and the limiting groove 32a.

As shown in FIG. 5 to FIG. 22, the upright vacuum cleaner 1 according to embodiments of the present disclosure further includes two wheels 38. In other words, the upright vacuum cleaner 1 mainly includes the brushroll assembly 100, the motor assembly 200, two wheels 38 and the body assembly 300. The brushroll assembly 100 includes the brushroll casing 12 and the brushroll 11 provided within the brushroll casing 12, and the brushroll casing 12 has the dust suction port. Referring to FIG. 6 and FIG. 7, the brushroll assembly 100 mainly includes the brushroll casing 12 and the brushroll 11; the brushroll casing 12 defines a brushroll air-suction channel 122 and has the dust suction port communicated with the brushroll air-suction channel 122; the brushroll 11 is rotatably provided within the brushroll casing 12. Referring to FIG. 5 and FIG. 6, the brushroll 11 extends along the horizontal direction (i.e. a left-and-right direction as shown in FIG. 5); the drive belt 13 is disposed between the motor assembly 200 and the brushroll 11 and connected to the motor 22 and the brushroll 11 respectively. When the motor shaft 221 of the motor 22 rotates, the motor shaft 221 drives the rotation of the drive belt 13 due to the frictional resistance between the motor shaft 221 and the surface of the drive belt 13. Similarly, the drive belt 13 drives the rotation of the brushroll 11 around its own axis due to the frictional resistance between the brushroll 11 and the surface of the drive belt 13, such that the brushroll 11 is driven to rotate by the motor 22, so as to realize the purpose of cleaning the ground.

The motor assembly 200 includes the motor housing 21 and the fan (not shown) provided in the motor housing 21. Referring to FIGS. 15 to 17, the motor assembly 200 mainly includes the motor housing 21, the motor 22 and the fan. The motor housing 21 defines a motor air-suction channel 216 and a motor air-exhaust channel (not shown) arranged in the spaced manner. The motor housing 21 has the dirty air outlet 211 communicated with the motor air-suction channel 216 and the brushroll air-suction channel 122 respectively, and a clean air inlet 212 and the air exhaust hole 213 communicated with the motor air-exhaust channel respectively. Specifically, the dirty air and dust are introduced into the brushroll air-suction channel 122 via the dust suction port of the brushroll casing 12, then into a motor air-suction channel 216 in the motor housing 21, and discharged into the body assembly 300 via the dirty air outlet 211 in the motor housing 21; clean air obtained by filtration of the body assembly 300 enters the motor air-exhaust channel within the motor housing 21 via the clean air inlet 212 of the motor housing 21, and finally is discharged to the outside from the air exhaust hole 213 of the motor housing 21.

Two wheels 38 (not shown) are disposed at two sides of the motor housing 21 and rotatably connected to the motor housing 21. Thus, when the user pushes a handle on the body 31, two wheels 38 rotate together, and drive the body assembly 300 and a brushroll assembly 100 moving forwards, so as to save efforts during the dust suction. Further, the body assembly 300 includes the body 31 and the bridging member 32 mounted on the body 31. The bridging member 32 includes a top plate 321 and two side plates 322 connected at both sides of the top plate 321. The two side plates 322 are clamped between two side walls of the motor housing 21 and the corresponding wheels 38 respectively and are rotatably connected to the motor housing 21.

Referring to FIG. 9, the body assembly 300 mainly includes the body 31, the bridging member 32 and a dirt cup 37. The dirt cup 37 may be detachably disposed on the body 31 and defines a separating chamber 371 therein, and the separating chamber 371 is communicated with the dirty air outlet 211 and the clean air inlet 212 on the motor housing 21 respectively. Specifically, dirty air and dust are introduced into the brushroll air-suction channel 122 via the dust suction port of the brushroll casing 12, then into the motor air-suction channel 216 in the motor housing 21, and discharged into the separating chamber 371 of the dirt cup 37 via the dirty air outlet 211 on the motor housing 21; clean air through filtration and processing of the dirt cup 37 enters the motor air-exhaust channel within the motor housing 21 via the clean air inlet 212 on the motor housing 21 and is discharged to the outside via the air exhaust hole 213 on the motor housing 21.

The bridging member 32 mainly includes the top plate 321 and two side plates 322, in which the two side plates 322 extend downwards along the vertical direction respectively. Upper ends of the two side plates 322 are fixed and connected to left and right ends of the top plate 321 respectively. When the motor housing 21, the bridging member 32 and the two wheels 38 are assembled, the bridging member 32 and the motor housing 21 are rotatably connected, and the two side plates 322 of the bridging member 32 are located between the wheel 38 at the corresponding position and the side wall of the motor housing 21 respectively. The bridging member 32 is rotatable with respect to the motor housing 21 and the wheels 38.

Therefore, in the upright vacuum cleaner 1 according to the present disclosure, the bridging member 32 is provided to the motor housing 21 and connected to the body 31 to facilitate driving the motor 22 in the motor housing 21 to rotate by the bridging member 32, so as to adjust the tension degree of the drive belt 13. The upright vacuum cleaner 1 has the simple structure and is easy to assemble or disassemble. Additionally, the motor 22 of the upright vacuum cleaner 1 is disposed vertically to reduce the occupation space of the upright vacuum cleaner 1 and facilitate diverse arrangements of various parts of the upright vacuum cleaner 1. In one word, the upright vacuum cleaner 1 has the simple and compact structure and is easy to assemble and disassemble with a high working efficiency.

Figure 20:
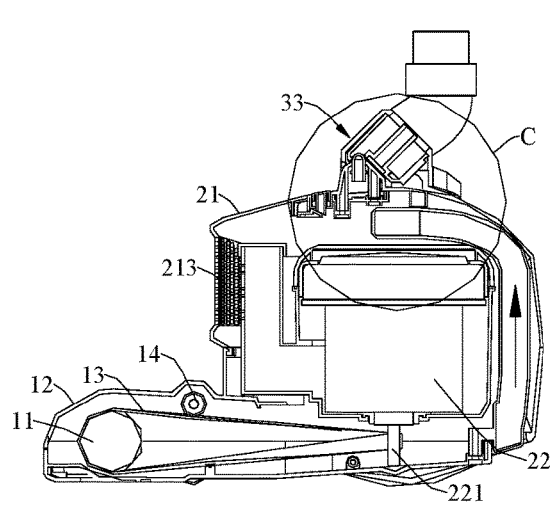
FIG. 20 is an assembly drawing of a motor assembly and a brushroll assembly of an upright vacuum cleaner according to an embodiment of the present disclosure.
Figure 21:
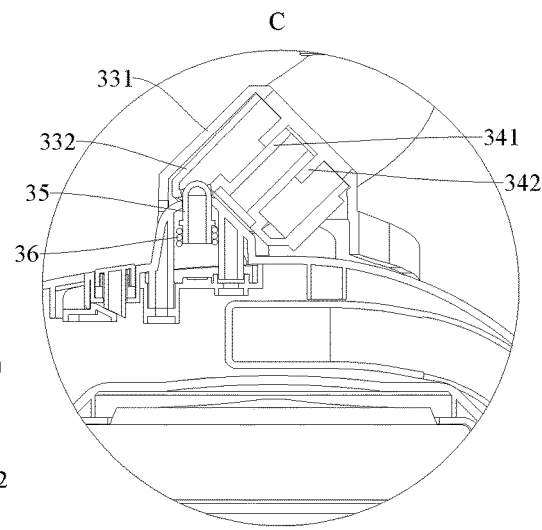
FIG. 21 is an enlarged view of part C of FIG. 20.

According to an embodiment of the present disclosure, the body 31 and the bridging member 32 are connected to each other by a connecting pipe assembly 33. Referring to FIG. 20 and FIG. 21, the motor 22 is disposed below the body 31 and the motor housing 21 is connected to the lower end of the body 31. The bridging member 32 is rotatably connected to the motor housing 21, and the top plate 321 of the bridging member 32 is connected to the lower end of the body 31 by the connecting pipe assembly 33.

Alternatively, the connecting pipe assembly 33 includes a first connecting pipe 331 and a second connecting pipe 332. Specifically, the first connecting pipe 331 is disposed on the top plate 321 of the bridging member 32 while the second connecting pipe 332 is disposed on the lower end of the body 31, in which the first connecting pipe 331 is fitted over the second connecting pipe 332.

That is, the connecting pipe assembly 33 mainly includes the first connecting pipe 331 and the second connecting pipe 332, in which the first connecting pipe 331 is connected to the top plate 321 of the bridging member 32; the second connecting pipe 332 is connected to the lower end of the body 31; the second connecting pipe 332 is inserted in the first connecting pipe 331 and is detachably connected to the first connecting pipe 331. Consequently, it is achievable to connect the body 31 with the bridging member 32 via the connecting pipe assembly 33, which is easy to manufacture and process with a simple structure and has low cost and high connection reliability.

Further, the body 31 and the bridging member 32 are positioned and cooperated with each other by a positioning assembly 34, so as to guarantee mounting the first connecting pipe 331 and the second connecting pipe 332 accurately by positioning. Alternatively, according to an embodiment of the present disclosure, the positioning assembly 34 includes a first positioning piece 341 and a second positioning piece 342. Specifically, the first positioning piece 341 is disposed on the top plate 321 of the bridging member 32, and the second positioning piece 342 is disposed on the lower end of the body 31. One of the first positioning piece 341 and the second positioning piece 342 is a positioning column therein, and the other is a positioning cartridge.

In other words, the positioning assembly 34 mainly includes the first positioning piece 341 and the second positioning piece 342. Referring to FIG. 53, the first positioning piece 341 is disposed within the first connecting pipe 331 and is configured as the positioning column that extends axially along the first connecting pipe 331; the second positioning piece 342 is disposed on the lower end of the body 31 and is configured as the positioning cartridge cooperating with the positioning column; after the first connecting pipe 331 and the second connecting pipe 332 are assembled, the positioning column is inserted in the positioning cartridge. Thus, it is possible to mount the first connecting pipe 331 and the second connecting pipe 332 accurately.

The upright vacuum cleaner 1 further includes a limiting column 35 that is disposed on the motor housing 21 movably in the up-and-down direction. When the body 31 is at in the upright position, the limiting column 35 is inserted into the bridging member 32 to cooperate with the bridging member 32 for limitation. When the body 31 moves from the upright position to the oblique position, the limiting column 35 is detached from the bridging member 32.

Referring to FIG. 21, the limiting column 35 is disposed on the top of the motor housing 21 and is movable in the up-and-down direction. When the upright vacuum cleaner 1 is in the working state, i.e. the body 31 at the second oblique position, the limiting column 35 is located outside of the connecting pipe assembly 33, and abuts against with the external wall of the connecting pipe assembly 33 to guarantee the body 31 remaining the oblique state during work, such that the motor 22 may drive the rotation of the brushroll 11 to improve the reliability and continuity of the operation of the upright vacuum cleaner 1. When the upright vacuum cleaner 1 is in the non-working state, i.e. the body 31 at the second upright position, the limiting column 35 is inserted into the connecting pipe assembly 33 to guarantee the body 31 remaining the upright state when the body 31 is unused. Thus, the limiting column 35 disposed on the motor housing 21 may serve for limiting positions with a simple, stable and reliable structure which occupies small space.

The upright vacuum cleaner 1 further includes the second elastic member 36 that is connected between the limiting column 35 and the motor housing 21 to make the limiting column 35 to move up and down. Therefore, the second elastic member 36 disposed on the limiting column 35 may serve as a cushion to avoid collision during the rotation of the body 31, so as to guarantee the stability and reliability of the body 31.

As shown in FIG. 21, in this embodiment, the top plate 321 of the bridging member 32 is provided with the first connecting pipe 331 that is internally provided with the positioning column; the lower end of the body 31 is provided with the second connecting pipe 332 that is internally provided with the positioning cartridge. After the second connecting pipe 332 is inserted into the first connecting pipe 331, the positioning cartridge is fitted over the positioning column.

Specifically, the first connecting pipe 331 is connected to the top plate 321 of the bridging member 32 and is internally provided with the first positioning piece 341 that is configured as the positioning column that extends axially along the first connecting pipe 331; the second connecting pipe 332 is connected to the lower end of the body 31 and is internally provided with the second positioning piece 342 that configured as the positioning cartridge cooperating with the positioning column. After the first connecting pipe 331 and the second connecting pipe 332 are assembled, the positioning column is inserted in the positioning cartridge, so as to mount the bridging member 32 and the body 31 accurately and guarantee the reliability of the connection therebetween.

Further, the motor housing 21 is provided with the limiting column 35 movable in the up-and-down direction. When the body 31 is in the upright state, the limiting column 35 passes through a bottom wall of a support sleeve and extends into the support sleeve to limit and cooperate with the support sleeve. When the body 31 moves from the upright state to the oblique state, the limiting column 35 is detached from the support sleeve. Thus, it is convenient to mount the bridging member 32 and the body 31, further to improve the reliability and accuracy of the connection therebetween.

According to an embodiment of the present disclosure, the air exhaust hole 213, a dirty air output pipe 214 and a clean air input pipe 215 are disposed on the motor housing 21; the motor air-suction channel 216 and the motor air-exhaust channel are disposed in the motor housing 21. The motor air-suction channel 216 is communicated between the dust suction port and the dirty air output pipe 214, while the motor air-exhaust channel is communicated between the clean air input pipe 215 and the air exhaust hole 213.

Referring to FIG. 11 to FIG. 17, the motor housing 21 is provided with the dirty air output pipe 214 communicated with the dirty air outlet 211 and the clean air input pipe 215 communicated with the clean air inlet 212 on the top. That is, the dirty air output pipe 214 is communicated with the motor air-suction channel 216, and the clean air input pipe 215 is communicated with the motor air-exhaust channel. The air exhaust hole 213 communicated with the motor air-exhaust channel is disposed at the front side of the motor housing 21. Specifically, the dirty air and dust are introduced into the brushroll air-suction channel 122 via the dust suction port of the brushroll casing 12, then into a motor air-suction channel 216 in the motor housing 21, and discharged into the body assembly 300 via the dirty air output pipe 214 on the motor housing 21; clean air obtained by filtration of the body assembly 300 enters the motor air-exhaust channel within the motor housing 21 via the clean air input pipe 215 of the motor housing 21 and then is discharged to the outside via an air exhaust hole 213 on the motor housing 21.

Figure 22:
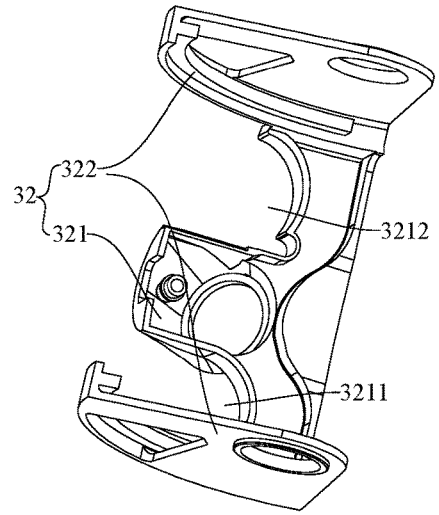
FIG. 22 is a schematic view of a bridging member of an upright vacuum cleaner according to an embodiment of the present disclosure.

Further, the bridging member 32 is provided with a first clearance groove 3211 for avoiding the dirty air output pipe 214 and a second clearance groove 3212 for avoiding the clean air input pipe 215. Referring to FIG. 22, the top plate 321 of the bridging member 32 is provided with the first clearance groove 3211 and the second clearance groove 3212 spaced apart and disposed along the left-and-right direction. When the body 31 is in the upright state, the dirty air output pipe 214 on the motor housing 21 is clamped in the first clearance groove 3211 of the bridging member 32, while the clean air input pipe 215 on the motor housing 21 is clamped in the second clearance groove 3212 of the bridging member 32. When the body 31 moves from the upright state to the oblique state, the bridging member 32 rotates with respect to the motor housing 21, so the dirty air output pipe 214 and the clean air input pipe 215 of the motor housing 21 are detached from the bridging member 32.

Preferably, the first clearance groove 3211 and the second clearance groove 3212 each are configured as semi-circular grooves. Thus, the first clearance groove 3211 and the second clearance groove 3212 cooperate with the respective side walls of the dirty air output pipe 214 and the clean air input pipe 215, to guarantee the compact structure and the aesthetic outlook.

Alternatively, the first clearance groove 3211 and the second clearance groove 3212 are symmetrically disposed along the longitudinal central axis. That is the dirty air output pipe 214 and the clean air input pipe 215 are spaced apart at left and right sides of the central line of the motor housing 21, and symmetrically disposed relative to the central line of the motor housing 21, which creates an aesthetic outlook in accordance with the human visual aesthetics with the reasonable arrangement, and facilitates diverse arrangements of various parts.

In some specific examples of the present disclosure, the upright vacuum cleaner 1 according to embodiments of the present disclosure includes the brushroll 11, the motor assembly 200 and the body assembly 300. Referring to FIG. 5 and FIG. 6, the brushroll 11 extends along the horizontal direction (i.e. the left-and-right direction as shown in FIG. 5); the motor assembly 200 is disposed in rear of the brushroll 11 and is connected to the brushroll 11 to drive the rotation of the brushroll 11 around its own center of rotation, so as to sweep the floor; dusts, debris and dirty air swept by the brushroll 11 are sucked into the brushroll air-suction channel 122 via the dust suction port of the brushroll casing 12 and are processed in the body assembly 300.

Further, the motor assembly 200 includes the motor housing 21 and the motor 22 disposed within the motor housing 21, in which the rotating axis of the motor 22 and the rotating axis of the brushroll 11 are disposed in a non-parallel manner, and the motor 22 drives the brushroll 11 to roll via the drive belt 13 and is rotatable between a first upright position of tensioning the drive belt 13 and a first oblique position of loosening the drive belt 13. Specifically, the rotating axis of the brushroll 11 extends along the horizontal direction (i.e. the left-and-right direction as shown in FIG. 5); the rotating axis of the motor 22 and the rotating axis of the brushroll 11 are disposed in the non-parallel manner. For example, the rotating axis of the motor 22 may extend along a vertical direction (i.e. an up-and-down direction as shown in FIG. 6) or be disposed obliquely with respect to the vertical direction; the drive belt 13 is provided between the motor 22 and the brushroll 11 and is connected to the motor 22 and the brushroll 11 respectively, such that the motor 22 may drive the brushroll 11 via the drive belt 13.

The body assembly 300 includes the body 31, the bridging member 32 and the dirt cup 37 mounted on the body 31, in which the bridging member 32 is rotatably connected to the motor housing 21 to make the body 31 rotatable between the upright position and the oblique position. Alternatively, the dirt cup 37 is detachably disposed on the body 31 and defines the separating chamber 371 therein, and the separating chamber 371 is communicated with a dirty air outlet 211 and a clean air inlet 212 on the motor housing 21 respectively. Specifically, dirty air and dust are introduced into the brushroll air-suction channel 122 via the dust suction port of the brushroll casing 12, then into a motor air-suction channel 216 in the motor housing 21, and discharged into the separating chamber 371 of the dirt cup 37 via the dirty air outlet 211 on the motor housing 21; clean air through filtration and processing of the dirt cup 37 enters the motor air-exhaust channel within the motor housing 21 via the clean air inlet 212 on the motor housing 21 and is discharged to the outside via an air exhaust hole 213 in the motor housing 21.

The bridging member 32 makes the motor 22 to move from the first oblique position to the first upright position when the body 31 is moved from the second upright position to the second oblique position.

In the upright vacuum cleaner 1 according to the embodiments of the present disclosure, the rotating axis of the motor 22 and the rotating axis of the brushroll 11 are disposed in the non-parallel manner, so as to reduce the volume of the motor 22 and hence the occupation space of the upright vacuum cleaner 1. Further, the upright vacuum cleaner 1 controls the rotation of the brushroll 11 and generation of the dust suction flow simultaneously by one motor 22, which occupies smaller space with fewer parts but realizes synchronous control over dust sweep and dust suction. Additionally, the motor of the upright vacuum cleaner 1 is disposed vertically to reduce the occupation space of the upright vacuum cleaner 1 and facilitate diverse arrangements of various parts of the upright vacuum cleaner 1.

The upright vacuum cleaner 1 further includes a clutching device 400 disposed between the bridging member 32 and the motor 22, in which the bridging member 32 makes the motor 22 to move from the first oblique position to the first upright position by the clutching device 400, when the body 31 moves from the second upright position to the second oblique position. Specifically, when the body 31 is located at the upright position, an axis of a motor shaft 221 of the motor 22 is disposed obliquely backwards with respect to an axis of the motor housing 21. That is, the motor 22 is at the oblique loosening position. In such a case, two ends of the drive belt 13 are fitted over the brushroll 11 and the motor shaft 221 respectively, but the drive belt 13 is in a loosening state. When the body 31 is located at the oblique position, the axis of the motor 22 extends along the vertical direction. That is, the motor 22 is at the upright tensioning position, in which case the drive belt 13 is tensioned. When the body 31 is turned manually from the second upright position to the second oblique position, the bridging member 32 on the motor housing 21 rotates relative to the motor housing 21 and makes the motor 22 to move from the first oblique position to the first upright position by the clutching device 400. In this process, a lower end of the motor shaft 221 is moved backwards gradually, to increase the distance between the lower end of the motor shaft 221 and the brushroll 11, so as to tension the drive belt 13 to implement the operations of dust sweep and dust suction.

In an example of the present disclosure, the rotating axis of the motor 22 is disposed in perpendicular to that of the brushroll 11, and the drive belt 13 is disposed at the twist angle of 90°. Referring to FIG. 5 and FIG. 6, the brushroll 11 is disposed in a horizontal plane and the rotating axis of the brushroll 11 extends along the horizontal direction; the motor 22 is disposed vertically within the motor housing 21 and the motor shaft 221 of the motor 22 is located in a vertical plane perpendicular to the rotating axis of the brushroll 11. That is, the rotating axis of the motor shaft 221 of the motor 22 and the rotating axis of the brushroll 11 are disposed in perpendicular to each other, so the upper half of the drive belt 13 and the lower half thereof are both twisted between the brushroll 11 and the motor shaft 221 for one time, and the twist angle of two ends of each section of the drive belt 13 is 90°.

Alternatively, according to an embodiment of the present disclosure, the motor shaft 221 of the motor 22 is disposed vertically. Specifically, the motor 22 mainly includes a motor body and a motor casing 222. The motor body is disposed within the motor casing 222 and is constituted by a core and the motor shaft 221. The motor shaft 221 of the motor 22 is connected to the core of the motor 22, and the motor 22 is arranged vertically. When the upright vacuum cleaner 1 is in non-working state, an upper end of the motor shaft 221 is disposed obliquely backwards relative to the vertical direction (i.e. the up-and-down direction shown in FIG. 3). During the dust suction of the upright vacuum cleaner 1, a central axis of the motor shaft 221 extends along the vertical direction. That is, the first end of the motor shaft 221 of the upright vacuum cleaner 1 may extend downwards relative to the core along the vertical direction (i.e. the up-and-down direction shown in FIG. 3). The first end of the drive belt 13 is fitted over the lower end of the motor shaft 221 and the second end of the drive belt 13 is fitted over the brushroll 11. Because the rotating axis of the brushroll 11 is disposed in the horizontal plane, the drive belt 13 is twisted at least one time between the brushroll 11 and the motor shaft 221. That is, the twist angle of the drive belt 13 between the alterable contact point of the drive belt 13 and the motor shaft 221 and the alterable contact point of the drive belt 13 and the brushroll 11 is 90°.

When the body 31 is at the upright position, the axis of the motor shaft 221 of the motor 22 is disposed obliquely backwards relative to the axis of the motor housing 21, in which case the two ends of the drive belt 13 are fitted over the motor shaft 221 and the brushroll 11 respectively, but the drive belt 13 is loosened. When the body 31 is at the oblique position, the axis of the motor 22 extends along the vertical direction. That is, the motor 22 is in an upright state, such that the drive belt 13 is tensioned. Specifically, when the body 31 is manipulated from the upright position to the oblique position, the lower end of the motor shaft 221 moves backwards gradually, to increase the distance between the lower end of the motor shaft 221 and the brushroll 11 and thus to tension the drive belt 13.

The upright vacuum cleaner 1 further includes an air-inlet pipe assembly. The air-inlet pipe assembly mainly includes the air-inlet pipe 51 and the hose 52. The air-inlet pipe 51 is fixed on the motor housing 21 and the first end of the air-inlet pipe 51 is communicated with the dirty air outlet 211 on the motor housing 21 and the second end thereof is communicated with a first end of the hose 52; a second end of the hose 52 is communicated with the separating chamber 371 of the dirt cup 37. Advantageously, the length of the hose 52 may be greater than that of the body 31 to prolong the transmission time and the filtration time of the dirty air and increase the dust suction capacity, so as to improve the working efficiency of the upright vacuum cleaner 1. Further, the middle part of the hose 52 may be hanged on the body 31 to make the structure compact. Alternatively, the hose 52 may be a plastic hose 52 or a rubber hose 52, so as to facilitate coiling up the hose 52 to save space and improve the space utilization rate.

The brushroll 11 includes a first brushroll section 111 provided with bristles, a second brushroll section 112 provided with bristles, and a connecting-shaft section 113 connected between the first brushroll section 111 and the second brushroll section 112. Specifically, an end of the first brushroll section 111 and an end of the second brushroll section 112 are connected to two ends of the connecting-shaft section 113 respectively.

Figure 18:
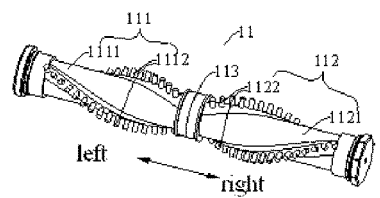
FIG. 18 is a schematic view of a brushroll of an upright vacuum cleaner according to an embodiment of the present disclosure.
Figure 19:
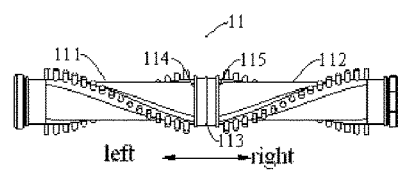
FIG. 19 is front view of the brushroll of the upright vacuum cleaner of FIG. 18.

Referring to FIG. 6, FIG. 18 and FIG. 19, the brushroll 11 is rotatably provided within the brushroll casing 12 and connected to the motor 22 to be driven to rotate around its rotating axis. The first brushroll section 111, the second brushroll section 112 and the connecting-shaft section 113 are configured as columns extending along the horizontal direction (i.e. the left-and-right direction shown in FIG. 18). The right end of the first brushroll section 111 is connected to the left end of the connecting-shaft section 113; the left end of the second brushroll section 112 is connected to the right end of the connecting-shaft section 113. Bristles may be provided to the respective outer side walls of the first brushroll section 111 and the second brushroll section 112 to clean the corresponding walls, but no bristle is provided on the connecting-shaft section 113 to facilitate connection with the drive belt 13.

Further, the drive belt 13 is winded upon the motor shaft 221 of the motor 22 and the connecting-shaft section 113, such that the brushroll 11 is driven to roll by the motor 22. Referring FIG. 2, the motor 22 is provided in the motor housing 21 and is connected to a fan and the brushroll 11 respectively. The motor 22 may drive the rotation of the fan to generate an air flow to provide a vacuuming power; and the motor 22 may drive brushroll 11 to rotate around its own axis to realize the purpose of cleaning the ground.

Referring to FIG. 6, the brushroll 11 and the electric 22 are spaced apart in the front-and-rear direction, and the brushroll 11 is located at the front side of the motor 22. The first end of the drive belt 13 is fitted over the motor shaft 221 of the motor 22 while the second end of the drive belt 13 is fitted over the brushroll 11. When the motor shaft 221 of the motor 22 rotates, the motor shaft 221 drives the rotation of the drive belt 13 due to the frictional resistance between the motor shaft 221 and the surface of the drive belt 13. Similarly, the drive belt 13 drives the brushroll 11 to rotate around its own axis due to the frictional resistance between the brushroll 11 and the surface of the drive belt 13, so as to realize the rotation of the brushroll 11 driven by the motor 22.

Preferably, according to an embodiment of the present disclosure, a first brushroll 11 and a second brushroll 11 are disposed symmetrically with respect to the drive belt 13. That is, the first brushroll section 111 has the same length in the axial direction as the second brushroll section 112. The first brushroll section 111 and the second brushroll section 112 are disposed symmetrically relative to the central part of the connecting-shaft section 113. The first end of the drive belt 13 is winded upon the connecting-shaft section 113, and the second end thereof is winded upon the motor shaft 221 of the motor 22. That is, the drive belt 13 divides the brushroll 11 into the symmetric first brushroll section 111 and second brushroll section 112. Consequently, the first brushroll section 111 and the second brushroll section 112 are subjected to balanced resistance to guarantee the stability of the brushroll 11, and the two sides of the drive belt 13 have the same cleaning scope.

According to an embodiment of the present disclosure, the respective central axes of the first brushroll section 111, the second brushroll section 112 and the connecting-shaft section 113 are located in the same line. That is, the first brushroll section 111, the second brushroll section 112 and the connecting-shaft section 113 are disposed co-axially. The motor 22 drives the first brushroll section 111, the second brushroll section 112 and the connecting-shaft section 113 rotating simultaneously, such that the motor 22 of the upright vacuum cleaner 1 may drive the fan, the first brushroll section 111, the second brushroll section 112 and the connecting-shaft section 113 rotating simultaneously, to implement the working mode of dust sweep and dust suction at both sides. Compared with the vacuum cleaner in the related art that realizes control over the rotation of the fan and the brushroll 11 respectively by two motors 22, the upright vacuum cleaner 1 has the simple structure and fewer parts, so it occupies the small space and is easy to assemble or disassemble, which improves the assembling efficiency, and may realize synchronous control over dust sweep and dust suction as well.

The brushroll 11 further includes a first baffle 114 and a second baffle 115. Specifically, the first baffle 114 is disposed between the connecting-shaft section 113 and the first brushroll section 111 to separate the connecting-shaft section 113 from the first brushroll section 111; the second baffle 115 is disposed between the connecting-shaft section 113 and the second brushroll section 112 to separate the connecting-shaft section 113 from the second brushroll section 112.

Referring to FIG. 18 and FIG. 19, the brushroll 11 mainly includes the first brushroll section 111, the second brushroll section 112 and the connecting-shaft section 113. The first baffle 114 and the second baffle 115 are disposed at left and right ends of the connecting-shaft section 113. Specifically, the first baffle 114 is disposed between the first brushroll section 111 and the connecting-shaft section 113, and the left side of the first baffle 114 is connected to the right end of the first brushroll section 111, the right side of the first baffle 114 connected to the left end of the connecting-shaft section 113; the second baffle 115 is disposed between the connecting-shaft section 113 and the second brushroll section 112, and the left side of the second baffle 115 is connected to the right end of the connecting-shaft section 113, the right side of the second baffle 115 connected to the left end of the second brushroll section 112.

Consequently, the first baffle 114 and the second baffle 115 disposed at two ends of the connecting-shaft section 113 may serve for positioning, and prevent the drive belt 13 from slipping off from the connecting-shaft section 113, i.e. prevent the drive belt 13 sliding off to the first brushroll section 111 or the second brushroll section 112, which may affect the operation of the drive belt 13.

The structure and the working process of the upright vacuum cleaner 1 will be described with reference to the accompanying drawings.

As shown in FIGS. 1 to 22, the upright vacuum cleaner mainly includes the brush assembly 100, the motor assembly 200, the body assembly 300, the clutching device 400 and the wheel 38.

The brush assembly 100 includes the brushroll 11 and the brushroll casing 12 that includes an upper casing 124 and a lower casing 125. The brushroll casing 12 defines a drive-belt mounting chamber 123, and a first air-suction channel 1221 and a second air-suction channel 1222 located at both sides of the drive-belt mounting chamber 123. The brushroll 11 is rotatably disposed in the brushroll casing 12, and the drive belt 13 is rotatably disposed within the drive-belt mounting chamber 123. Further, an end of the drive belt 13 is winded upon the middle part of the brushroll 11. Referring to FIG. 49 and FIG. 50, the brushroll 11 mainly includes the first brushroll section 111, the second brushroll section 112 and the connecting-shaft section 113 disposed coaxially. The first brushroll section 111, the second brushroll section 112 are connected to both ends of the connecting-shaft section 113. The first brushroll section 111 includes the first body 1111 and the first bristle 1112 disposed on the first body 1111; the second brushroll section 112 includes the second body 1121 and the second bristle 1122 disposed on the second body 1121. The end of the drive belt 13 is winded upon the connecting-shaft section 113 of the brushroll 11. Further, the tensioning wheel 14 is disposed on the brushroll casing 12 to tension the drive belt 13.

The motor assembly 200 includes the motor housing 21, the motor 22 and the fan (not shown). The motor housing 21 defines the motor air-suction channel 216 and the motor air-exhaust channel arranged in the spaced manner. The motor air-suction channel 216 includes the first branch channel 2161 communicated with the first air-suction channel 1221 and the second branch channel 2162 communicated with the second air-suction channel 1222. Specifically, the motor housing 21 is configured as a hollow column and defines the first branch channel 2161 and the second branch channel 2162 therein that are spaced apart from each other. The motor 22 is located between the first branch channel 2161 and the second branch channel 2162, in which a first end of the first branch channel 2161 is communicated with the first air-suction channel 1221 and a first end of the second branch channel 2162 is communicated with the second air-suction channel 1222, while a second end of the first branch channel 2161 and a second end of the second branch channel 2162 are communicated with the dirt cup 37 respectively.

The motor housing 21 has the dirty air outlet 211 communicated with the motor air-suction channel 216, and the clean air inlet 212 communicated with the motor air-exhaust channel. The motor 22 is disposed upright inside the motor housing 21 and is rotatable with respect to the motor housing 21. That is, the motor shaft 221 of the upright vacuum cleaner 1 is arranged along the vertical direction, and the motor 22 is disposed in rear of the brushroll 11 and connected to the brushroll 11 via the drive belt 13. Specifically, the first end of the drive belt 13 is fitted over the motor shaft 221 of the motor 22 while the second end of the drive belt 13 is fitted over the brushroll 11. When the motor shaft 221 of the motor 22 rotates, the motor shaft 221 drives the rotation of the drive belt 13, and the drive belt 13 drives the brushroll 11 rotating around its own rotating axis, so as to make the motor 22 drive the rotation of the brushroll 11. Referring to FIG. 10, since the axis of the motor shaft 221 of the motor 22 and that of the brushroll 11 are disposed in the non-parallel manner, the drive belt 13 between the brushroll 11 and the motor shaft 221 is twisted for one time with an angle of 30° to 90°. Further, the motor 22 may drive the rotation of the fan to generate an air flow to provide a vacuuming power; and the motor 22 may drive the brushroll 11 to rotate around its own axis to realize the purpose of cleaning the ground.

The body assembly 300 includes the body 31, the bridging member 32 and the dirt cup 37, in which the dirt cup 37 and the bridging member 32 are mounted on the body 31 respectively; the bridging member 32 is connected to the lower end of the body 31. Two side plates 322 of the bridging member 32 are disposed outside the side wall of the motor housing 21 respectively and rotatably connected to the motor housing 21. Meanwhile, the rotatable wheel 38 is disposed outside the two side plates 322 of the bridging member 32 to make it easier for the user to push the upright vacuum cleaner 1. The dirt cup 37 defines the separating chamber 371 therein, and includes the air inlet 372 and the air outlet 373 communicated with the separating chamber 371 respectively. The body 31 defines the body air-exhaust channel 311 therein. The air exhaust pipe 39 is disposed between the body 31 and the motor shroud 21; two ends of the air exhaust pipe 39 are communicated with the body air-exhaust channel 311 of the body 31 and the clean air inlet 212 of the motor shroud 21 respectively. The dust and debris sucked through the dust suction port of the brushroll casing 12 are delivered into the motor air-suction channel 216 of the motor housing 21 sequentially through the first air-suction channel 1221 and the second air-suction channel 1222, and then into the separating chamber 371 of the dirt cup 37 for filtration. The clean air obtained is discharged to the motor air-exhaust channel of the motor housing 21 from the air outlet 373 of the dirt cup 37, and finally discharged to the outside from the air exhaust hole 213 of the motor housing 21.

The triggering member of the clutching device 400 is rotatably disposed on the motor housing 21, and cooperate with the bridging member 32 and the motor casing 222 of the motor 22, such that the bridging member 32 drives the rotation of the clutching device 400, and the clutching device 400 realizes the rotation of the motor 22.

Referring to FIG. 5, when it is in the non-working state, the upright vacuum cleaner 1 may be placed upright on the ground, i.e. the body 31 being at the upright position, which occupies small space. If the user needs to use the upright vacuum cleaner 1, the user may hold the handle of the body 31 to push the upright vacuum cleaner 1 during work. First, the user may turn on the switch of the upright vacuum cleaner 1, in which case the drive belt 13 is in the loosening state, and the motor 22 cannot drive the rotation of the brushroll 11. That is, the upright vacuum cleaner 1 is in a stand-by state where the brushroll 11 does not sweep dust. Then, the body 31 is turned manually from the second upright position to the second oblique position, the bridging member 32 on the motor housing 21 rotates clockwise along with the body 31 relative to the motor housing 21, such that the bridging member 32 realizes the rotation of the motor 22 in the motor housing 21 by driving the clutching device on the motor housing 21. That is, the motor 22 is moved from the oblique loosening position to the upright tensioning position. In this process, the lower end of the motor shaft 221 moves backwards gradually, which increases the distance between the lower end of the motor shaft 221 and the brushroll 11, so as to tension the drive belt 13. The motor 22 may drive the rotation of the brushroll 11 by the drive belt 13 to implement the operations of dust sweep and dust suction. Of course, the present disclosure is not limited thereby. The user may rotate the body 31 from the second upright position to the second oblique position directly, in which process the drive belt 13 is tensioned; and then the switch of the upright vacuum cleaner 1 is turned on to implement the operations of dust sweep and dust suction simultaneously.

That is, the user just needs to turn on the switch to start or stop dust sweep by manipulating the direction of the handle of the body 31, with simple operations instead of operation control keys. Alternatively, the switch may be disposed on the handle of the body 31 to facilitate manual operations, or may be disposed on the brushroll casing 12 or the motor housing 21 below the body 31 to make it convenient to turn on the switch by foot. The motor 22 may be disposed near the ground. That is, the gravity of the motor 22 is lower than that of the motor 22 of the vacuum cleaner in the related art, such that the upright vacuum cleaner 1 having the body 31 of the same length in the present disclosure is easier to operate with less effort.

When the upright vacuum cleaner 1 is in the working state, the dirty air and dust are introduced into the brushroll air-suction channel 122 via the dust suction port of the brushroll casing 12, then into a motor air-suction channel 216 in the motor housing 21, and discharged into the body assembly 300 via the dirty air output pipe 214 on the motor housing 21; clean air obtained by filtration of the body assembly 300 enters the motor air-exhaust channel within the motor housing 21 via the clean air input pipe 215 of the motor housing 21. The air exhaust pipe 39 is disposed between the body 31 and the motor housing 21; two ends of the air exhaust pipe 39 are communicated with the body air-exhaust channel 311 of the body 31 and the clean air inlet 212 of the motor housing 21 respectively. The clean air obtained after filtration and processing of the dirt cup 37 is introduced into the motor air-exhaust channel in the motor housing 21 sequentially through the body air-exhaust channel 311, the air exhaust pipe 39 and the clean air inlet 212, and finally discharged to the outside from the air exhaust hole 213 of the motor housing 21.

It shall be noted that when the body 31 is manipulated from the second upright position to the second oblique position at the predetermined angle, the motor 22 may rotate synchronously along with the body 31. When the body 31 rotates to the predetermined angle, the user may manipulate the body 31 freely without any impact on the tensioned state of the drive belt 13. That is, when the motor 22 rotates from the first oblique position to the first upright position, the body 31 may be manipulated freely without affecting the dust sweep and dust suction of the upright vacuum cleaner 1. Of course, the present disclosure is not limited thereby. The rotation angle of the body 31 may be directly associated with that of the motor 22, i.e. adjusting the position of the motor 22 by adjusting the oblique angle of the body 31 manually so as to adjust the tension degree of the drive belt 13.

The other configurations and operations of the upright vacuum cleaner 1 according to embodiments of the present disclosure are known to those skilled in the art, which will not be elaborated herein.

Reference throughout this specification to "an embodiment," "some embodiments," "an example," "specific examples" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples. Those skilled in the art can integrate and combine different embodiments or examples and the features in different embodiments or examples in the specification.

Although embodiments of the present disclosure have been shown and illustrated, it shall be understood by those skilled in the art that various changes, modifications, alternatives and variants without departing from the principle and spirit of the present disclosure are acceptable. The scope of the present disclosure is defined by the claims or the like.

What is claimed is:

1. An upright vacuum cleaner, comprising:
   a brushroll assembly comprising a brushroll casing and a brushroll provided within the brushroll casing;
   a motor assembly comprising a motor housing and a motor provided within the motor housing;
   a body assembly comprising a body and a bridging member mounted on the body, wherein the bridging member is pivotally connected to the motor housing to make the body rotatable between an upright position and an oblique position; and
   an elastic assembly provided between the brushroll casing and the bridging member, and configured to be pressed downward against the brushroll casing by the bridging member when the body rotates from the upright position to the oblique position.

2. The upright vacuum cleaner according to claim 1, wherein the bridging member has a contact edge in cooperative contact with the elastic assembly to compress the elastic assembly, and the contact edge is configured as an arc edge with a rotating axis of the bridging member as a central axis.

3. The upright vacuum cleaner according to claim 2, wherein the bridging member is formed with a limiting groove into which an end of the elastic assembly pops along the contact edge when the body moves to the upright position, and the limiting groove is jointed with the contact edge.

4. The upright vacuum cleaner according to claim 1, wherein the elastic assembly comprises:
   a movable block configured to contact and cooperate with the bridging member; and
   a first elastic member having two ends clamped between the movable block and the brushroll casing.

5. The upright vacuum cleaner according to claim 4, wherein a surface of the movable block in cooperative contact with the bridging member is configured as a curved surface.

6. The upright vacuum cleaner according to claim 4, wherein the brushroll casing is formed with an accommodating groove and the first elastic member is accommodated elastically within the accommodating groove.

7. The upright vacuum cleaner according to claim 4, wherein the first elastic member is a spring.

8. The upright vacuum cleaner according to claim 1, wherein the bridging member comprises a top plate and two side plates connected at both sides of the top plate, each side plate pivotally connected to two side walls of the motor housing; there are two elastic assemblies and each elastic assembly cooperates with the two side plates respectively.

9. The upright vacuum cleaner according to claim 8, wherein the two elastic assemblies are provided at both sides of the motor housing symmetrically.

10. The upright vacuum cleaner according to claim 8, further comprising:
    two wheels provided at both sides of the motor housing and rotatably connected to the motor housing, wherein the two side plates are clamped between the two side walls of the motor housing and the corresponding wheels respectively.

11. The upright vacuum cleaner according to claim 8, wherein the body and the bridging member are connected to a connecting pipe assembly.

12. The upright vacuum cleaner according to claim 11, wherein the connecting pipe assembly comprises:
    a first connecting pipe provided on the top plate of the bridging member; and
    a second connecting pipe provided at a lower end of the body, wherein the first connecting pipe is fitted over the second connecting pipe.

13. The upright vacuum cleaner according to claim 8, wherein the body and the bridging member are positioned by a positioning assembly to cooperate with each other.

14. The upright vacuum cleaner according to claim 13, wherein the positioning assembly comprises:
    a first positioning element provided on the top plate of the bridging member; and
    a second positioning element provided at the lower end of the body;
    wherein one of the first positioning element and the second positioning element is a positioning column and the other thereof is a positioning cartridge.

15. The upright vacuum cleaner according to claim 1, further comprising:
    a limiting column provided on the motor housing movably in an up-and-down direction, wherein the limiting column is inserted into the bridging member to cooperate with the bridging member for limitation when the body is in the upright position, and the limiting column is detached from the bridging member when the body moves from the upright position to the oblique position.

16. The upright vacuum cleaner according to claim 15, further comprising:
a second elastic member connected between the limiting column and the motor housing to make the limiting column movable in the up-and-down direction.

17. The upright vacuum cleaner according to claim 1, wherein a first connecting pipe is provided on a top plate of the bridging member and is provided with a positioning column therein;
a second connecting pipe is provided at the lower end of the body and is provided with a positioning cartridge therein; and
the positioning cartridge is fitted over the positioning column after the second connecting pipe is inserted in the first connecting pipe.

18. The upright vacuum cleaner according to claim 1, wherein the brushroll casing has a dust suction port; the motor housing is provided with an air exhaust hole, a dirty air output pipe and a clean air input pipe; a motor air-suction channel and a motor air-exhaust channel are provided in the motor housing; the motor air-suction channel is communicated between the dust suction port and the dirty air output pipe, while the motor air-exhaust channel is communicated between the clean air input pipe and the air exhaust hole; the bridging member is provided with a first clearance groove for avoiding the dirty air output pipe and a second clearance groove for avoiding the clean air input pipe.

19. The upright vacuum cleaner according to claim 18, wherein the first clearance groove and the second clearance groove each are configured as a semi-circular groove and arranged axially symmetrically relative to a longitudinal central line of the bridging member.

20. The upright vacuum cleaner according to claim 1, wherein a rotating axis of the motor and a rotating axis of the brushroll are disposed in a non-parallel manner; the motor drives the brushroll to roll by a drive belt and is rotatable relative to the motor housing between an upright tensioning position where the drive belt is tensioned and an oblique releasing position where the drive belt is loosened; and the bridging member makes the motor to move from the oblique position to the upright position when the body rotates from the upright position to the oblique position.

* * * * *